April 21, 1942. J. BRONAUGH 2,280,766
CONTROL SYSTEM
Original Filed Aug. 1, 1936
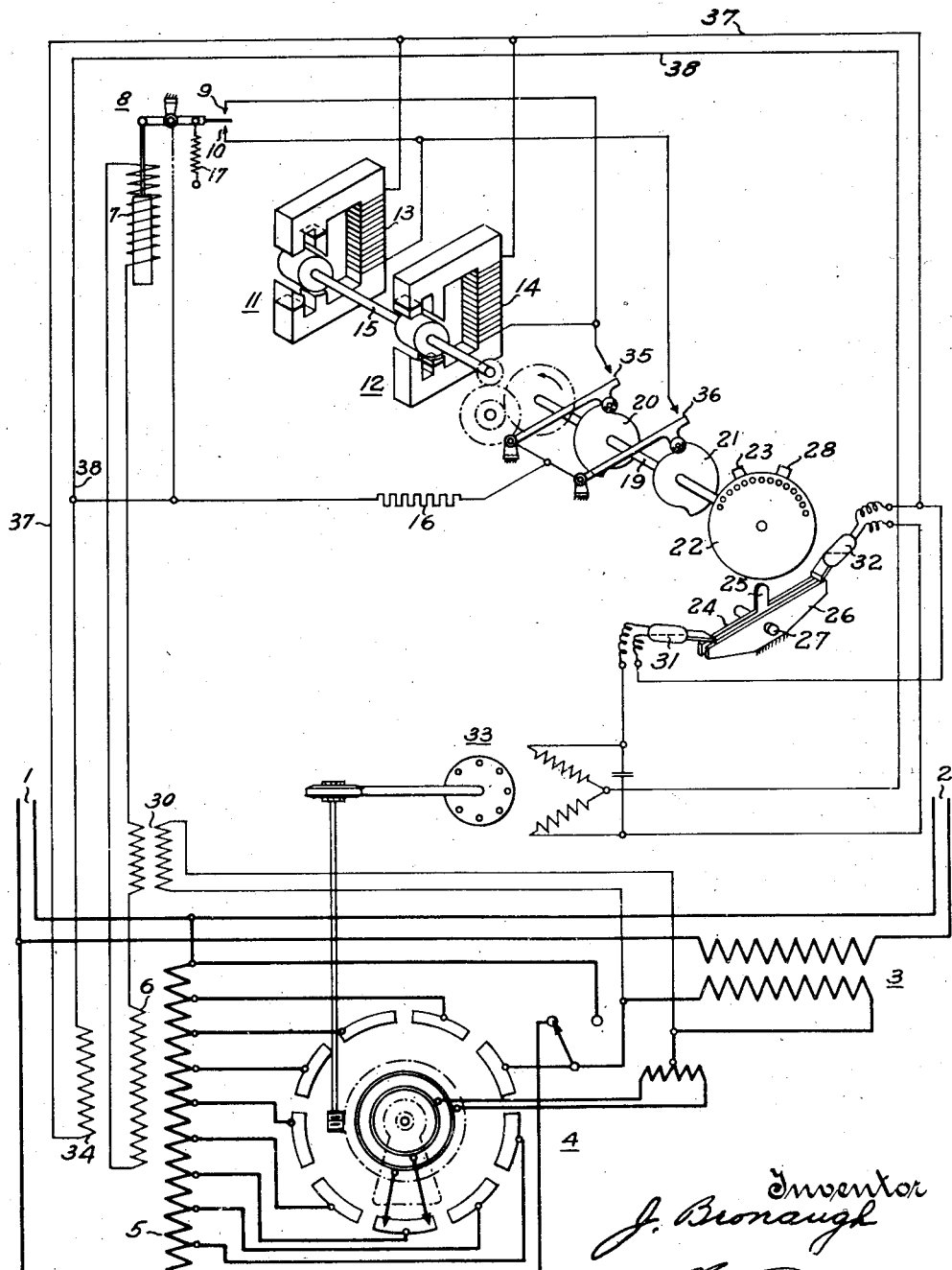
Inventor
J. Bronaugh
by
Attorney Patented Apr. 21, 1942

2,280,766

UNITED STATES PATENT OFFICE 2,280,766

CONTROL SYSTEM

Joseph Bronaugh, Richmond, Va., assignor to Allis-Chalmers Manufacturing Company, Milwaukee, Wis., a corporation of Delaware Continuation of application Serial No. 93,769, August 1, 1936. This application filed January 15, 1940, Serial No. 313,849

5 Claims. (Cl. 171—119)

This invention relates in general to control apparatus and particularly to control apparatus which may be utilized to control a regulator for a given condition.

In control systems for maintaining a constant condition, such for example as systems for regulating a line for constant voltage, it is desirable to have a predetermined adjustable time delay between a change in line voltage and the action of the regulator correcting for the change. This is advantageous in order that changes in voltage due to surge conditions which immediately correct themselves will not affect the regulator. It is also necessary to provide a neutral position or zone for the regulator operator so that if the line condition remains constant the regulator will not act and also to provide a means for returning the regulator operator to the neutral position or zone after an operation of the regulator. Control apparatus has been utilized to attain the above results, however, such control apparatus has been either so complicated as to easily get out of order or so sensitive and delicate as to be ineffective to give the desired results.

It is therefore an object of this invention to provide a control apparatus avoiding the above disadvantages which is simple and rugged in construction while at the same time being sufficiently sensitive to give the desired result.

It is also an object of this invention to provide a regulator with a control apparatus having a neutral position and an automatic means for returning such apparatus to neutral position when operated therefrom.

It is also an object of this invention to provide a motor operated switch operable in either direction from a neutral position with a means for automatically energizing the motor so as to return the switch to neutral position.

It is also an object of the present invention to provide an improved motor operated delayed response switch.

It is a further object of this invention to provide in a line voltage regulation system a motor operated switch having windings energized through a contact making voltmeter to operate the regulator to raise or lower the line voltage and at the same time to energize another winding of the motor to return the switch to neutral position when the line voltage has been properly changed.

Objects and advantages other than those above set forth will be apparent from the following description when read in connection with the accompanying drawing in which:

The single figure of the drawing is a diagrammatic showing of the control apparatus of the present invention as applied to a tap changer under load system.

In the drawing a line circuit 1 has connected between it and a load circuit 2 a regulating transformer 3 which is energized so that its voltage either boosts or bucks the line voltage. The transformer 3 is energized from the tapped winding 5 connected across the line in such manner that the voltage across the load circuit 2 remains constant. The energization of the transformer 3 is varied by connecting thereacross a variable amount of the winding 5 by means of the tap changer under load 4.

In control apparatus for controlling the tap changer 4 it is desirable and necessary that the control apparatus operate the motor 33 in either direction to the extent necessary for the voltage change required by the contact making voltmeter 8. However, when the contact making voltmeter 8 comes to a neutral position, thus showing that the voltage on the load circuit 2 is properly regulated, it is necessary that the control apparatus return to a neutral position in order to be ready to either raise or lower the line voltage dependent upon the next move of the contact making voltmeter 8. It is also desirable that a predetermined time delay intervene between the action of the contact making voltmeter in closing contacts 9 or 10 and the operation of the switches 31 or 32 for operating the tap changer 4. The present invention combines these desired results and utilizes a motive means which normally is utilized to operate the control apparatus in the opposite direction for returning the apparatus to a neutral position when the control effect desired has been produced.

The solenoid winding 7 of the contact making voltmeter 8 is energized from the regulated voltage by means of windings 6 and 30, the winding 6 supplying line voltage and the windings 30 supplying the added or subtracted regulated increment. The solenoid core member is normally balanced against a spring 17 so that when the desired voltage condition of circuit 2 is maintained, the contacts 9 and 10 will both be open. If the voltage on this circuit drops a predetermined amount, the energization of the winding 7 becomes less, thereby closing the upper contact 9, which completes a circuit from the upper end of the winding 34 through wire 38, the contact making voltmeter, contact 9, the energizing winding 14 of the motor 12, the wire 37 to the other end of the winding 34. Energization of the motor 12 rotates the shaft 15 so that the shaft 19 is rotated in the arrow direction at a reduced rate, as for example by the gearing shown. Fastened rigidly to the shaft 19 is a disk 22 having holes at intervals around its circumference, in any of which may be suitably fastened the members 23 and 28. The disk 22 and the control apparatus generally are shown in the drawing in the neutral position.

Upon rotation of the disk 22 in the arrow direction for a predetermined time dependent upon the hole in which the member 23 has been placed, the member 23 will engage the upstanding portion 25 of an operating member 24, thereby causing the same to pivot about the shaft 27 in a clockwise direction as viewed in the drawing and thereby tipping the mercury switch 31 so as to close its contact. Closure of the switch 31 energizes the motor 33 in such direction to move the tap changer 4 to a new position which increases the energization of the transformer 3 in boosting relation or decreasing the energization in bucking relation, thus increasing the voltage of circuit 2. If movement of the tap changer 4 one tap is sufficient to provide the desired change in voltage, the contact making voltmeter 8 will return to the neutral position in which contacts 9 and 10 will both be open. If the change of one tap does not effect the desired change, the tap changer motor will operate to move the tap changer to succeeding taps until the desired change is effected. When the desired change has been attained and the contact making voltmeter 8 comes to the neutral position shown, it is desirable that the control apparatus return to a neutral position so that succeeding changes, other than immediately recurring similar changes, called for by the contact making voltmeter 8 will be effected only with the desired time delay.

In order to provide the desired return to a neutral position, the motive means 11, which normally is used to rotate the switch in the opposite direction from the arrow direction shown, is energized at a reduced energization at all times when the control apparatus is off the neutral position. In the example above described, when the contact making voltmeter closes its contact 9 and energizes the winding 14 of the motor 12 to rotate the disk 22 in the arrow direction, the first rotation of the shaft 19 also rotates a cam 21 in the arrow direction which rotation immediately closes the switch 36, thereby completing a circuit from the winding 34 through wire 37, the winding 13 of the motor 11, the switch 36, resistance 16 and wire 38 to the other side of winding 34. At such time the two motors 11 and 12 are tending to rotate the shaft 15 in opposite directions, however, due to the fact that winding 13 is energized through the resistance 16, the motor 12 predominates and functions as above stated. As soon as the contact making voltmeter comes to a neutral position opening the switch 9, the energization of winding 14 ceases. The winding 13 therefore rotates the shaft 15 to rotate the shaft 19 oppositely to the arrow direction to the neutral position in which the cam switch 36 opens, deenergizing the winding 13. The control apparatus is then in a condition for operation by the contact making voltmeter either to raise the voltage or to lower the voltage.

When the contact making voltmeter 8 is energized so as to raise the voltage, the contact 10 is closed and the motor 11 is energized which rotates the disk 22 oppositely from the arrow direction so that the member 28 operates the switch member 24 to operate the switch 32. In this case the cam 20 closes the switch 35 thereby energizing the motor 12 under reduced energization and, similarly to the previously described operation, when the desired change has been effected, the motor 12 returns the apparatus to the neutral position. The term "neutral position" as used herein designates a neutral zone during which the means for returning disk 22 is deenergized. This neutral zone is not necessarily a single position of disk 22, but includes a neutral path or range defined by cams 20 and 21 and in which the control is neutral, that is, in which contacts 35 and 36 are open.

The present embodiment provides for the algebraic summation of recurring voltage changes each of which, in itself, is not sufficient to cause operation of the tap changer. This is effected in that the return of the disk 22 is under reduced energization and therefore at reduced speed. For example, if the voltage changes in a given direction and moves disk 22 a given amount and the voltage returns to normal, the disk reverses and begins to return to neutral position. If a similar voltage change recurs before the disk has returned to neutral position, the disk is again moved forward but to a position nearer actuating position. If the voltage changes recur in sufficient number and the intervals between such changes are sufficiently short, the tap changer will be operated to the next step.

The present embodiment of the invention has been described and shown because it so clearly illustrates the invention, however, the invention is not limited to the embodiment shown and described. For example, the contact making voltmeter 8 may be an instrument responsive to conditions such as temperature, pressure, water level, etc., in fact to any regulated condition, the control of which it initiates. Likewise the disk 22 may be an operator which controls any type of condition, for example, those as above stated, as long as a neutral position corresponding to the desired control condition is provided for the operator 22, and further that the control apparatus which is responsive to the initiating means corresponding to the contact making voltmeter 8 provides an automatic return to such neutral position when the desired control effect has been attained. The motors 11 and 12 may be combined into a single motive means or may be an electroresponsive means operative upon a common member to move any operator to either of two given positions from a neutral position. This application is a continuation of my application Serial No. 93,769, filed August 1, 1936, for Control system.

Although but one embodiment of the present invention has been illustrated and described, it will be apparent to those skilled in the art that various changes and modifications may be made therein without departing from the spirit of the invention or from the scope of the appended claims.

It is claimed and desired to secure by Letters Patent:

1. In a circuit control system, a relay responsive to a rapid change in a given circuit condition, an electroresponsive device provided with a first winding and a second winding, an operating member having a neutral position, means including said relay for energizing said first winding to a degree sufficient to provide movement of said member in one direction, means including said relay for energizing said second winding to a degree sufficient to provide movement of said member in another direction, means including a circuit controller operable by said member a predetermined time, greater than the time of said rapid change, after energization of said first winding for changing said circuit condition, and means including a second circuit controller operable upon initial movement of said member from said member from said neutral position for energizing said second winding to a degree less than and during said energization of said first winding to provide return of said member to said neutral position upon deenergization of said first winding.

2. In apparatus for controlling an electric circuit subject to rapid fluctuations in a circuit condition, a switch means operative in response to said fluctuations in said circuit condition, electro-responsive means operative in response to said switch means in either direction from a neutral position, means operable in response to said electro-responsive means to either of two positions from a neutral position, said means being operable after a time delay greater than the time of one of said fluctuations, and automatic means for reversing and returning said last said means to said neutral position when operative control of said electro-responsive means by said switch means has ceased.

3. In apparatus for controlling the voltage of an electric circuit, switch means operative upon a change in voltage of said circuit occurring within a predetermined time, motor means operative in either direction from a neutral position in response to operation of said switch means, control means operable to either of two positions from a neutral position in response to operation of said motor means for a time relatively greater than said predetermined time, for raising or lowering said circuit voltage, and automatic means for reversing and returning said control means to said neutral position when said circuit voltage returns to its original value.

4. In a tap changer under load circuit control system, a contact making voltmeter connected to said circuit and operable upon change in said circuit voltage of a relatively small duration, electro-responsive means provided with two energizing windings selectively energizable by said contact making voltmeter and operable in either direction from a neutral position, a tap changing motor, means operable to either of two given positions from a neutral position in response to operation of said electro-responsive means for controlling said tap changing motor after a time delay of a duration relatively large compared to said duration of voltage change, and a switch means for energizing the other of said windings of said electro-responsive means through a resistance for returning said last means to said neutral position.

5. In a tap changer under load circuit control system, a contact making voltmeter connected to said circuit and operative to either of two positions from neutral position in response to rapid fluctuations in said circuit voltage above or below a predetermined value, motor means having two windings one of which is energized in response to operation of said contact making voltmeter to rotate said motor in a given direction, means including a switch member operative with a time delay relatively greater than the time of one of said fluctuations in response to said motor means for controlling said tap changer to control said circuit voltage, and a switch operable upon movement of said motor means to energize said other winding of said motor means for returning said switch to said neutral position when the desired tap changes have been made.

JOSEPH BRONAUGH.